United States Patent
Sautter et al.

(10) Patent No.: US 10,883,649 B2
(45) Date of Patent: Jan. 5, 2021

(54) MONITOR OF A CAMERA-MONITOR SYSTEM

(71) Applicant: Continental Automotive GmbH, Hannover (DE)

(72) Inventors: Silja Sautter, St. Georgen (DE); Werner Miethig, Brigachtal (DE); Rajesh Ningaraju, Brundavana Nagar (IN); Axel Hügle, Furtwangen (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/346,405

(22) PCT Filed: Oct. 24, 2017

(86) PCT No.: PCT/EP2017/077103
§ 371 (c)(1),
(2) Date: Apr. 30, 2019

(87) PCT Pub. No.: WO2018/082965
PCT Pub. Date: May 11, 2018

(65) Prior Publication Data
US 2019/0263327 A1     Aug. 29, 2019

(30) Foreign Application Priority Data
Nov. 1, 2016   (DE) .................. 10 2016 221 434

(51) Int. Cl.
*F16M 11/04*         (2006.01)
*B60R 11/02*         (2006.01)
(Continued)

(52) U.S. Cl.
CPC ......... *F16M 11/041* (2013.01); *A47B 81/064* (2013.01); *B60R 1/00* (2013.01);
(Continued)

(58) Field of Classification Search
CPC ......... A47B 1/064; A47B 81/064; H04N 5/64
See application file for complete search history.

(56) References Cited

U.S. PATENT DOCUMENTS

| 6,663,155 B1 | 12/2003 | Malone et al. ............... 296/37.8 |
| 6,693,519 B2 | 2/2004 | Keirstead ...................... 340/435 |

(Continued)

FOREIGN PATENT DOCUMENTS

| DE | 101 30 703 A1 | 1/2003 |
| DE | 10 2012 014 448 A1 | 1/2014 |

(Continued)

OTHER PUBLICATIONS

D. Jarvis et al., "How can I transmogrify a fixed monitor post in to a variable height monitor post?", stackexchange.com Home Improvement (Aug. 2013) (Year: 2013).*

(Continued)

*Primary Examiner* — David N Werner
(74) *Attorney, Agent, or Firm* — Slayden Grubert Beard PLLC

(57) ABSTRACT

Various embodiments include a monitor of a camera-monitor system in a motor vehicle comprising: a display mounted in a field of vision of a driver of the motor vehicle; wherein the monitor is height-adjustable.

6 Claims, 2 Drawing Sheets

(51) Int. Cl.
  *B60R 1/00* (2006.01)
  *H04N 5/64* (2006.01)
  *A47B 81/06* (2006.01)
  *B60R 11/00* (2006.01)

(52) U.S. Cl.
  CPC ....... *B60R 11/0235* (2013.01); *F16M 11/046* (2013.01); *H04N 5/64* (2013.01); *B60R 2011/0084* (2013.01); *B60R 2300/802* (2013.01); *B60R 2300/8046* (2013.01); *F16M 2200/027* (2013.01); *F16M 2200/028* (2013.01)

(56) References Cited

U.S. PATENT DOCUMENTS

| | | | | |
|---|---|---|---|---|
| 7,293,747 | B2* | 11/2007 | Wang | F16M 11/10 248/125.2 |
| 7,474,522 | B2 | 1/2009 | Bliven | 361/679.22 |
| 7,667,782 | B2* | 2/2010 | Iwai | G02F 1/133308 348/794 |
| 2004/0004541 | A1 | 1/2004 | Hong | 340/435 |
| 2005/0035252 | A1 | 2/2005 | Chen | 248/284.1 |
| 2007/0205340 | A1 | 9/2007 | Jung | 248/125.9 |
| 2008/0055411 | A1 | 3/2008 | Lee | 348/148 |
| 2012/0044429 | A1* | 2/2012 | Guerra | F16M 13/022 348/837 |
| 2013/0025392 | A1 | 1/2013 | Lee et al. | 74/411 |
| 2015/0146359 | A1 | 5/2015 | Katsunuma | 361/679.22 |
| 2015/0293553 | A1 | 10/2015 | Aoyagi et al. | 248/422 |

FOREIGN PATENT DOCUMENTS

| | | | |
|---|---|---|---|
| GB | 1522454 A | 8/1978 | |
| JP | 52108100 U | 8/1977 | |
| JP | 2003265873 A | 9/2003 | ............... B26B 1/08 |
| JP | 2005047366 A | 2/2005 | |
| JP | 2007290570 A | 11/2007 | |
| KR | 20040003216 A | 1/2004 | ............... B60R 1/00 |
| KR | 10-1299120 B1 | 8/2013 | |
| WO | 2018/082965 A1 | 5/2018 | |

OTHER PUBLICATIONS

International Search Report and Written Opinion, Application No. PCT/EP2017/077103, 15 pages, dated Feb. 9, 2018.
German Office Action, Application No. 10 2016 221 434.9, 11 pages, dated Apr. 12, 2019.
Japanese Office Action, Application No. 2019522592, 3 pages, dated Mar. 23, 2020.
Korean Office Action, Application No. 2020035549295, 12 pages, dated May 25, 2020.

* cited by examiner

MONITOR OF A CAMERA-MONITOR SYSTEM

CROSS-REFERENCE TO RELATED APPLICATIONS

This application is a U.S. National Stage Application of International Application No. PCT/EP2017/077103 filed Oct. 24, 2017, which designates the United States of America, and claims priority to DE Application No. 10 2016 221 434.9 filed Nov. 1, 2016, the contents of which are hereby incorporated by reference in their entirety.

TECHNICAL FIELD

The present disclosure relates to cameras and displays. Various embodiments may include a monitor of a camera-monitor system in a motor vehicle.

BACKGROUND

DE 10 2012 014 448 A1 describes a camera-monitor system with a monitor arranged fixedly on the A pillar of a truck. Said monitor is optimally aligned with the driver during the installation, but is fixed subsequently. Particularly tall or short drivers fall outside the optimally set range of the monitor when optimization with a driver of average height is carried out during installation.

U.S. Pat. No. 6,693,519 B2 discloses a camera-monitor system in which the monitor is adjustable by means of a ball-and-socket joint and wing nuts. Adjustment requires both hands of the driver: one hand for actuating the wing nuts and the other for aligning the monitor. Both known solutions allow adjustment of the monitor during operation only in a complicated manner, if at all.

SUMMARY

The teachings of the present disclosure describe a monitor of a camera-monitor system. For example, some embodiments include a monitor (2) of a camera-monitor system in a motor vehicle (1), which monitor can be mounted in the field of vision of a driver of the motor vehicle (1), characterized in that the monitor (2) is height-adjustable.

In some embodiments, the height-adjustable monitor (2) is held both by a force fit and by a form fit.

In some embodiments, at least one spring (27) is provided for the force fit, and an intermeshing rack (7) and toothing (8) for the form fit.

In some embodiments, the monitor (2) has at least one sliding element (9) which is guided in a slide rail (12) of a holding element (3) and which has a toothing (8) on a first longitudinal side (16), and, on its second longitudinal side (17) lying opposite the first longitudinal side (16), strikes against a rail (10) which is supported in relation to the holding element (3) by means of springs (27), wherein the holding element (3) has a rack (7) which lies opposite the toothing (8) of the sliding element (9).

In some embodiments, a damping element (25) is arranged between rail (10) and sliding element (9).

In some embodiments, a damping element (28) is arranged at the lower end of the rail (10).

In some embodiments, the holding element (3) has at least one of the following elements: a cable guiding element (18), a fastening element (19) for a covering element, a cable feedthrough (20), an installation opening (21), or a fastening element (26) for the rail (10).

In some embodiments, the rail (10) is connected in a horizontally displaceable manner to the holding element (3).

In some embodiments, the rail (10) has a projection (23) which engages in a recess (24) of the sliding element (9).

As another example, some embodiments include a method for adapting a monitor (2) of a camera-monitor system as claimed in one of the preceding claims, having the following steps: exerting pressure on the monitor (2) in the horizontal direction, in the process releasing a force fit fixing the monitor (2) in the vertical direction, displacing the monitor (2) in the vertical direction, relieving pressure on the monitor (2) in the horizontal direction, and latching and reproducing the force fit.

BRIEF DESCRIPTION OF THE DRAWINGS

Further details and advantages of the teachings herein can be gathered from the description below of exemplary embodiments with reference to the figures. In the drawing.

DETAILED DESCRIPTION

Figure 1:
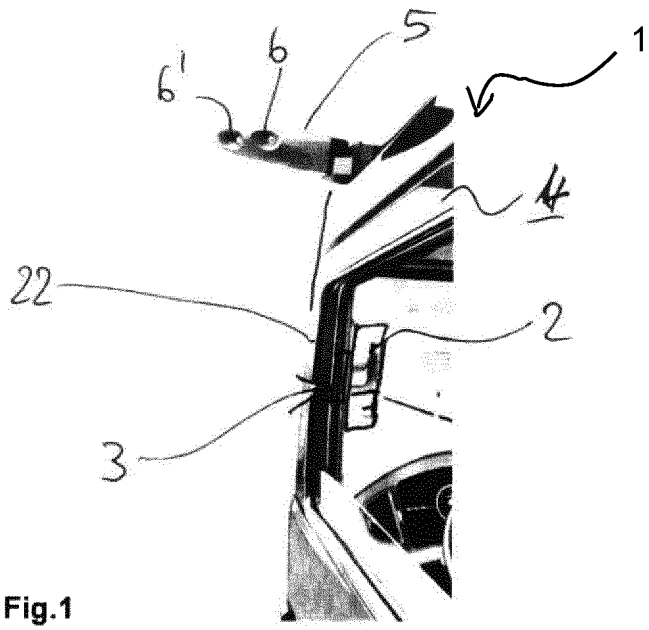
FIG. 1 shows a truck with a camera-monitor system incorporating teachings of the present disclosure.

In some embodiments of the teachings herein, the monitor is height-adjustable. In some embodiments, the monitor is optimally set to the respective driver depending on the vehicle height, and therefore optimum fields of view in the direction of travel and also of the monitor, the digital mirror, are ensured.

In some embodiments, a system holds the height-adjustable monitor both by a force fit and by a form fit. The monitor is stably held at the set height even during shaking that occurs during the driving mode. The monitor here is, for example, a flat screen, a liquid crystal display LCD, a TFT screen, the projection surface of a projection unit, or another suitable monitor. The form fit may be achieved by intermeshing tooth elements, such as racks, a rack and gearwheel, plug elements with associated sockets and the like. The force fit may be achieved by a mechanical spring, by fluid pressure, by elastically deformable material or similar solutions. In some embodiments, at least one spring is provided for the force fit, and intermeshing racks for the form fit. These elements are reliable and cost-effective.

In some embodiments, the monitor has at least one sliding element. The sliding element is guided in a slide rail of a holding element and has a toothing on a first longitudinal side. On its second longitudinal side lying opposite the first longitudinal side, said sliding element strikes against a rail which is supported in relation to the holding element by means of springs. The holding element has a rack which lies opposite the toothing of the sliding element and interacts therewith. The slide rail is guided movably in the vertical direction in the sliding element.

The toothing and the rack are coordinated with each other, for example with a rectilinear or oblique toothing, with a symmetrical or asymmetrical cross section, or in another suitable manner. A precision toothing permits a height adjustment in small increments, but requires a higher spring force for the secure holding. A coarse toothing manages with a smaller spring force, but only permits a rough adjustment of the height. In some embodiments, external force displaces the slide rail horizontally counter to the spring force in order then to carry out a vertical movement of the monitor. The external force acts in the horizontal direction and eliminates the form fit caused by the spring force. After horizontal adjustment of the monitor and ending of the exertion of force in the horizontal direction, the form fit is reproduced.

In some embodiments, there is a damping element between sliding element and rail. Said damping element is, for example, a rubber band which is preferably arranged on the rail. The damping element prevents noises during the height adjustment and additionally serves for damping noise during normal operation. A damping element which is composed of plastic, rubber or another suitable cushioning material is arranged at the lower end of the rail. The damping element cushions the lower stop of the sliding element when the latter upon exertion of force in the horizontal direction has arrived at the lower end of the slide rail because of gravity.

In some embodiments, the holding element has at least one of the following elements: A cable-guiding element serves for guiding electric lines supplying the monitor with energy, images and other information, and other lines and cables. A fastening element for a covering element serves for the fastening thereof. The covering element serves for sight and dust protection for the monitor-holding device. A cable feedthrough for the passage of the above-mentioned lines and cables is likewise provided. In order to mount the holding element on, for example, an A pillar of a truck in the driver's cab thereof, or in a passenger vehicle or in another vehicle, an installation opening is provided. A fastening element serves for the horizontally movable fastening of the rail.

In some embodiments, the rail is connected in a horizontally displaceable manner to the holding element. This takes place counter to the prestressing of the springs, in order to release or to reproduce the form fit. In some embodiments, the rail has a projection which engages in a recess of the sliding element. This prevents the monitor from falling out in the horizontal direction.

Some embodiments include a method for adapting a monitor of a camera-monitor system including the following steps: exerting pressure on the monitor in the horizontal direction. Releasing a force fit which fixes the monitor in the vertical direction. Displacing the monitor in the vertical direction. Relieving pressure on the monitor in the horizontal direction. The force fit is reproduced in the process by latching.

FIG. 1 shows the driver's cab of a truck, the motor vehicle 1, with a monitor 2 incorporating the teachings herein. The monitor 2 is mounted height-adjustably on the A pillar 22 of the motor vehicle 1 by means of a holding element 3. A camera holder 5 with two cameras 6, 6' is arranged at the upper end of the driver's cab 4 of the motor vehicle 1. After suitable processing, the cameras 6, 6' arranged on the outside of the motor vehicle 1 transmit an image corresponding to the rearview mirror of a customary motor vehicle to the monitor 2. One camera image is depicted here in the upper half of the monitor 2, and the other in the lower half thereof. By exertion of pressure on the monitor 2 in the horizontal direction, the fastening thereof in the vertical direction is released, the monitor can be displaced vertically, and, after the pressure ends, latches in the newly set vertical position.

Figure 2:
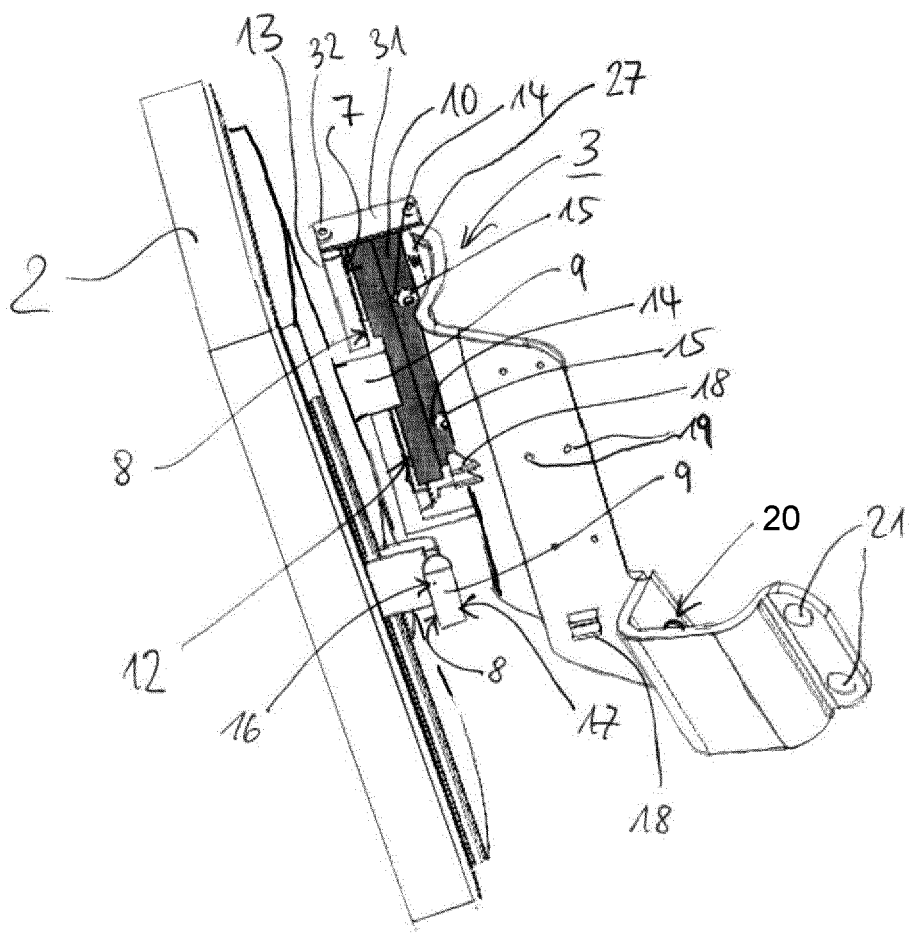
FIG. 2 shows a monitor incorporating teachings of the present disclosure with a holding element in a three-dimensional illustration.

FIG. 2 shows a monitor 2 incorporating teachings of the present disclosure including a holding element 3 in a three-dimensional illustration. A rack 7 arranged on the holding element 3 engages in a corresponding toothing 8 of a sliding element 9 of the monitor 2. A rail 10 of the holding element 3 is prestressed against the sliding element 9 and the rack 7 by means of springs 11. It is seen that the monitor 2 is arranged on end, and has a sliding element 9 on both sides. The front sliding element 9 in the figure is held in a further holding element which is not illustrated here. The rear sliding element 9 in the figure is guided movably in the vertical direction in a slide rail 12.

The two sliding elements 9 have substantially the same properties and are mirror-inverted with respect to each other. The description of one applies correspondingly to the other. The slide rail 12 is formed by a guide region 13 of the holding element 3, which guide region is connected to the rack 7, and by the rail 10. The rail 10 has elongated holes 14 through which screws 15 for fastening the rail 10 to the guide region 13 protrude. The toothing 8 is arranged on a first longitudinal side 16 of the sliding element 9, the second longitudinal side 17 of which strikes against the rail 10. The holding element 3 furthermore has cable-guiding elements 18 which serve for guiding cables which connect the monitor to other devices of the motor vehicle 1, for example in an electrically conducting, light-conducting or purely mechanical manner. A covering element (not illustrated here) for sight and dust protection of the holding element 3 is fastened by means of fastening elements 19. A cable feedthrough 20 serves for the passage of the above-mentioned cables. Installation openings 21 serve for fastening the holding element 3 to the A pillar 22 of the motor vehicle 1. A covering plate 31 is fastened to the upper end of the slide rail 12 by means of screws 32. This prevents the sliding elements 9 from sliding out upward and therefore the monitor 2 from falling out.

Figure 3:
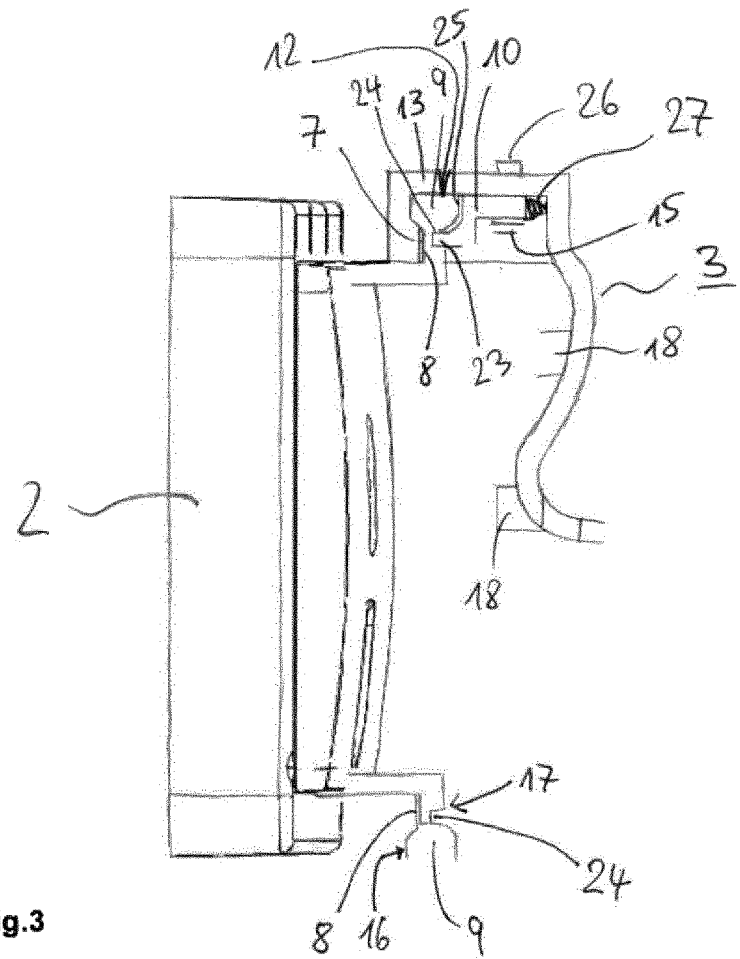
FIG. 3 shows a monitor incorporating teachings of the present disclosure with a holding element in a top view.

FIG. 3 shows the monitor 2 from FIG. 2 in top view. The sliding element 9 with a toothing 8 on the first longitudinal side 16 thereof is seen. The toothing 8 engages in teeth of the rack 7 of the holding element 3. The second longitudinal side 17 of the sliding element 9 strikes against the rail 10. A projection 23 of the rail 10 engages here in a recess 24 of the sliding element 9. This prevents the monitor 2 from falling out in the horizontal direction, in the downward direction in the figure. A damping element 25 is arranged between rail 10 and sliding element 9. Said damping element is fastened to the rail 10 and extends over the entire length thereof. The damping element 25 is in the form of a rubber band or a foam band.

The rail 10 is fastened to the holding element 3 by means of a screw 15. The screw 15 engages in a fastening element 26 of the holding element 3. Since the screw 15 is arranged in an elongated hole 14, not illustrated here, of the rail 10, the rail 10 is movable in the horizontal direction, to the right or left in the figure. If a force directed to the right is exerted on the monitor 2 from the left, the rail 10 is displaced and compresses the spring 27. In the process, the toothing 8 is released from the rack 7, the sliding element 9 can then be displaced in the vertical direction, i.e. upward and downward out of the plane of FIG. 3. If the desired vertical position is reached, the exertion of pressure on the monitor 2 is ended. The force of the spring 27 then pushes the rail 10 and therefore the sliding element 9 to the left, as a result of which toothing 8 and rack 7 come into engagement again. The monitor 2 is therefore fixed in its vertical position by a form fit and force fit. The guide region 13 is located at the outer end, illustrated at the top in the figure, of the holding element 3. The rack 7 is arranged on the guide region 13.

Figure 4:
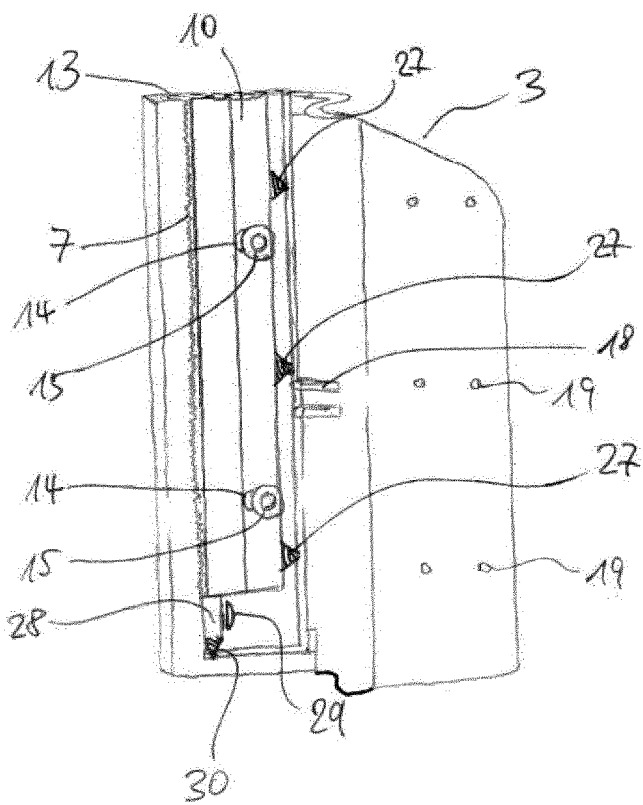
FIG. 4 shows a holding element of a monitor incorporating teachings of the present disclosure.

FIG. 4 shows the holding element 3 of a monitor 2 incorporating the teachings herein without the monitor mounted therein. The guide region 13 with the rack 7 arranged thereon is seen. At the right end of the guide region 13, the rail 10 is fastened to the holding element 3 by means of screws 15. The screws 15 are guided through elongated holes 14. Conical springs 27 support the rail 10 against the holding element 3. In some embodiments, the fastening elements 19 can also serve for the fastening of a further holding element 3 which engages in the sliding element 9, which faces the observer in FIG. 2.

A damping element 28 which is fastened to the holding element 3 by means of a screw 29 is arranged at the lower end of the holding element 3, below the rack 7. The screw 29 reaches through an elongated hole, not illustrated here, which extends in the vertical direction. The damping element 28 is supported downwards by means of a spring 30. If the monitor 2, and therefore the sliding element 9 in the slide rail 12, moves downward, it strikes against the damping element 28 and is braked in a manner cushioned via the spring 30. This prevents sudden braking and therefore damage to the monitor 2 upon reaching the lower stop.

In some embodiments, there is a monitor 2 which serves as a replacement for conventional vehicle mirrors. Customarily, the traditional vehicle mirrors are installed "rigidly" on the vehicle. Up to now, the monitors 2, also called displays, have also been installed rigidly in the vehicle 1. Rigidly installed displays have significant disadvantages for drivers who are particularly tall or particularly short in the recognition of the driving situation since displays sometimes depict relatively blurred images because of the lighting and viewing angle for said people. This is also a problem for drivers with varifocals with the adaption between the display being "CLOSE" and the driving situation being "DISTANT". The teachings herein allow an optimum solution for the above-mentioned circle of people by means of the display of what is referred to as a digital mirror being height-adjustable.

In some embodiments, the display is held in position with a metallic "bracket structure" by means of two racks 7, 8 which are mounted resiliently. Since here there is both a force fit via the springs 27 and a form fit via the rack 7 and the toothing 8, the principle is doubly secured against vibration. If the driver wishes to adjust the height of the display, the driver presses from the front against the monitor 2 counter to the spring force of the springs 27. The monitor 2 is therefore decoupled from the rack 7 and can be displaced upward or downward in the pressed state.

The driver can then let go of the monitor 2 in the desired position and said monitor then snaps again into the rack 7 via spring force. Should the position not yet be optimum, the operation can be repeated as frequently as desired. Depending on the driver's height, the monitor 2 can thereby be set optimally to the particular driver, and therefore optimum fields of view in the driving direction and also of the monitor 2 are ensured.

What is claimed is:

1. A monitor of a camera-monitor system in a motor vehicle, the monitor comprising:
    a display mounted in a field of vision of a driver of the motor vehicle;
    wherein a vertical position of the monitor is adjustable and does not affect a horizontal position of the monitor; and
    wherein the vertical position of the monitor is held by both a force fit and a form fit;
    a spring exerting a force establishing the force fit;
    a sliding element;
    a holding element including a slide rail for the sliding element;
    wherein the sliding element includes a toothing on a first longitudinal side and, on its second longitudinal side lying opposite the first longitudinal side, strikes against a rail;
    wherein the rail is supported in relation to the holding element by means of springs;
    the holding element includes a rack lying opposite the toothing of the sliding element; and
    the slide rail is connected in a horizontally displaceable manner to the holding element.

2. The monitor as claimed in claim 1, further comprising an intermeshing rack and toothing for the form fit.

3. The monitor as claimed in claim 1, further comprising a damping element arranged between the slide rail and the sliding element.

4. The monitor as claimed in claim 1, further comprising a damping element arranged at a lower end of the slide rail.

5. The monitor as claimed in claim 1, wherein the holding element comprises at least one element selected from the group consisting of: a cable guiding element, a fastening element for a covering element, a cable feedthrough, an installation opening, and a fastening element for the rail.

6. The monitor as claimed in claim 1, wherein the slide rail includes a projection engaging a recess of the sliding element.

* * * * *